United States Patent [19]

Mori et al.

[11] Patent Number: 4,625,285
[45] Date of Patent: Nov. 25, 1986

[54] ROBOT CONTROLLER WITH PARALLEL PROCESSING OF PLURAL WEIGHTED POSITION DATA WHICH IS COMBINED AT OUTPUT TO FORM A SINGLE COMMAND

[75] Inventors: Shunji Mori; Masanobu Ito, both of Aichi, Japan

[73] Assignee: Mitsubishi Denki Kabushiki Kaisha, Tokyo, Japan

[21] Appl. No.: 618,169

[22] Filed: Jun. 7, 1984

[30] Foreign Application Priority Data

Jun. 14, 1983 [JP] Japan ................................ 58-106035

[51] Int. Cl.$^4$ ........................ G05B 19/407; B25J 9/00; B25J 13/00
[52] U.S. Cl. .................................. 364/513; 364/170; 364/174; 901/2; 318/568
[58] Field of Search ............... 364/513, 174, 170, 474, 364/475; 318/568; 901/2, 9

[56] References Cited

U.S. PATENT DOCUMENTS

| | | | |
|---|---|---|---|
| 4,140,953 | 2/1979 | Dunne | 364/513 |
| 4,403,281 | 9/1983 | Holmes et al. | 364/513 |
| 4,453,221 | 6/1984 | Davis et al. | 364/513 |

*Primary Examiner*—Jerry Smith
*Assistant Examiner*—Allen MacDonald
*Attorney, Agent, or Firm*—Sughrue, Mion, Zinn, Macpeak, and Seas

[57] ABSTRACT

A robot controller including a movement command forming unit, object position variable forming unit, a compressing/enlarging unit, a plurality of position control units, and an object position command unit. The movement command forming unit specifies the formation of a plurality of movement object positions. The object position variable forming unit forms a position variable used to correct a position deviation from a previously taught position or a manually entered position. The compressing/enlarging unit operates to compress or enlarge object position variables outputted by the object position variable forming unit. The position control unit receives respective object position variables to perform velocity control and position control. The object position command unit adds the output signals of the position control units to output an object position command, according to which the robot is moved to the object position.

15 Claims, 4 Drawing Figures

ROBOT CONTROLLER WITH PARALLEL PROCESSING OF PLURAL WEIGHTED POSITION DATA WHICH IS COMBINED AT OUTPUT TO FORM A SINGLE COMMAND

BACKGROUND OF THE INVENTION

The present invention relates to robot controllers, and more particularly to a position control operation and a speed control operation in a robot controller which, when an operating instruction covering a plurality of object positions is issued, are effected in the movement of the robot to an object position.

A conventional robot controller is constructed as shown in FIG. 1. In FIG. 1, reference numeral 1 designates a program memory section for storing a program inputted by an operator and position variable data assembled by teaching or manual data inputting; 2, an instruction decoding section for decoding program instructions stored in the program memory section 1 and being executed at present; 3, an instruction execution control section for executing the instructions of a program according to instruction decoding results provided by the instruction decoding section 2; 4, an object position generating section for forming, when a robot movement instruction is executed, its object position or a position variable; and 5, an object position outputted by the object position generating section.

The object position 5 depends on the type of the movement instruction. In the case of a movement instruction involving linear interpolation, the object position is indicated by the combination of the coordinates (X,Y,Z) of the terminal (finger) of a robot at the destination and the coordinates—Eulerian angle $(\alpha,\beta,\gamma)$—which indicates the angular orientation of the terminal of the robot. In the case of an articulation operation, the object position is indicated by the coordinates $(J_1 \ldots, J_k, \ldots)$ of the axes of the robot at the destination (where $J_k$ is the coordinates of the k-th axis). For the following description of the operation of the robot, the object position will be given in the orthogonal coordinate system.

Further in FIG. 1, reference numeral 6 designates a position control unit including a speed command generating section 7 for performing speed control in the movement of the robot and a position command generating section 8 for providing movement commands at predetermined time instants; reference symbols $\vec{v}$ and $\vec{a}$ respectively designate allowable velocity and acceleration values permitted by the robot controller; reference numeral 9 designates a speed compensation section which provides the above-described speed $\vec{v}$ and acceleration $\vec{a}$ in response to an instruction from the instruction execution control section 3; 10, a coordinate transformation section for converting a position command which is provided in the orthogonal coordinate system (X,Y,X,$\alpha$, $\beta$, $\gamma$) by the position control unit 6 into a position command which is expressed in the coordinate system $(J_1 \ldots, J_k, \ldots)$ of the axes of the robot; 11, a position command which is outputted by the coordinate conversion section and is expressed by the coordinates of the axes of the robot; and 12, a positioning control section which, in response to a position command 13, performs positioning with respect to the movement of the robot.

The operation of the robot controller thus arranged will now be described.

When one of the programs stored in the program memory section 1 is selected, the instruction decoding section 2 start to decode the instructions in the program thus selected. The data obtained as a result of the instruction decoding operation is applied to the instruction execution control section 3. When the instruction in the program which has been decoded by the instruction decoding section 2 concerns the movement of the robot, the instruction execution control section 3 instructs the object position generating section 4 to generate an object position to which the robot should be moved. When the object position generating section 4 provides the object position 5, the position control section 6 performs position control and speed locus control with respect to the movement of the robot to the object position utilizing the allowable speed $\vec{v}$ and acceleration $\vec{a}$ set by the speed compensation section 9.

The position control unit 6 includes the speed command generating section 7 and the position command generating section 8, as described above. The speed command generating section 7 performs speed control and locus control for the movement of the robot. The position command generating section 8 performs position control.

Speed control and position control operations are carried out in a sampling mode. That is, a speed and a position are given every predetermined period of time $\Delta t$. When the preceding ($\Delta t$ before) speed $\vec{v}_{i-1}$, object position $\vec{P}_d$, position $\vec{P}_{i-1}$, and allowable velocity $\vec{v}$ and acceleration $\vec{a}$ provided by the speed compensation selection are inputted, the speed command generating section 7 sets the direction of the present velocity $\vec{v}_i$ the same as that of the vector $\vec{P}_d - \vec{P}_{i-1}$. Furthermore, the section 7 determines whether the present velocity is acceptable or should be made equal to or lower than the preceding speed. The position command generating section 8 provides the current position $\vec{P}_i$ according to the preceding position $\vec{P}_{i-1}$ and the current velocity $\vec{v}_i$ from the speed command generating section 7. The current velocity $\vec{v}_i$ and position $\vec{P}_i$ thus obtained are utilized for calculation of the next following velocity $\vec{v}_{i+1}$ and position $\vec{P}_{i+1}$ after the period of time $\Delta t$ elapses.

When the current position $\vec{P}_i$ has been determined, the coordinate transformation section 10 performs coordinate transformation from the orthogonal coordinate system $(X,Y,Z,\alpha,\beta,\gamma)$ into the coordinates system $(J_1, \ldots, J_6)$ of the axes of the robot.

The positioning control section 12 determines the present movements of the axes according to the coordinates 11 which have been obtained as described above. The present movements of the axes thus determined are applied through a D/A converter to respective motors. As a result, the robot is moved to the present object position $(\vec{P}_i)$.

The above-described operations are repeatedly carried out until the robot reaches the object position $\vec{P}_d$.

The conventional robot controller designed as described above is permitted only one object position in the movement of the terminal of the robot. Therefore, in the control of a locus consisting of a series of points, it is necessary to change the object position at each point, and it is impossible to realize a continuous locus including a time axis. Furthermore, the conventional robot controller is disadvantageous in that the orientation of the terminal of the robot which has been moved to the object position cannot be changed by the outputs of a visual sensor or a touch sensor.

SUMMARY OF THE INVENTION

An object of the present invention is to eliminate the above-described difficulties accompanying a conventional robot controller. More specifically, an object of the invention is to provide a robot controller which is provided with a plurality of object positions and position control means, equal in number to the object positions, and in which the inputs of the position control means are not switched, but instead the outputs of the position control means are added so that the subordinate object positions can affect the main object position, the terminal of the robot can quickly respond to changes in the environment arount it, and the locus thereof can be externally changed with ease.

The robot controller according to the invention comprises movement command forming means, object position variable forming means, means for compressing or enlarging object position variables, a plurality of position control means, and object position command means.

The movement command forming means specifies formation of a plurality of movement object positions. The object position variable forming means includes means for forming a position variable to correct a position deviation from the position which has been taught in advance and/or means for forming a position variable to manually correct the position, so that position variables are produced by correcting a plurality of movement object positions provided in response to a movement command from the movement command forming means. The means for compressing or enlarging object position variables operates to compress or enlarge a plurality of object position variables outputted by the object position variable forming means. The position control means receives the respective object position variables thus compressed or enlarged to perform velocity control and position control in the movement to the respective object positions. The object position command means operates to add the output signals of the position control means to output an object position command, according to which the robot is moved to the object position.

DESCRIPTION OF THE PREFERRED EMBODIMENTS

The present invention will be described with reference to preferred embodiments. Specifically, FIG. 2 shows an example of a robot controller constructed according to the invention.

Figure 2:
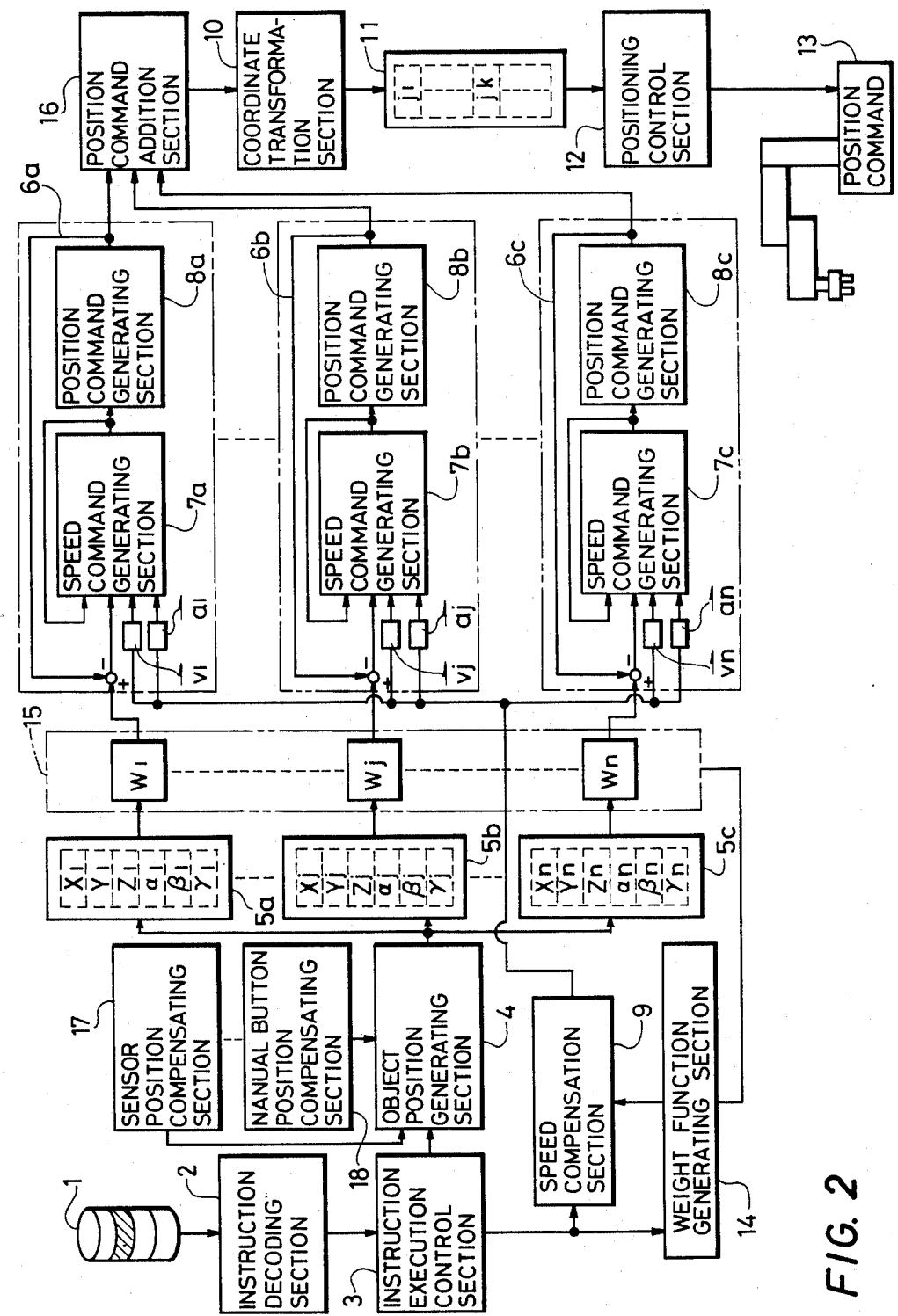
FIG. 2 is a block diagram showing the arrangement of an example of a robot controller according to the invention.

In FIG. 2, a movement command forming unit includes a program memory unit 1, an instruction decoding section 2, an instruction execution control section 3, and a speed compensation section 9.

An object position variable forming unit includes an object position generating section 4, a sensor position compensating section 17, and a manual button position compensating section 18. The object position generating section 4 produces a plurality of movement object position variables (n movement object position variables) in response to a plural-movement object-position generating commands.

Figure 3:
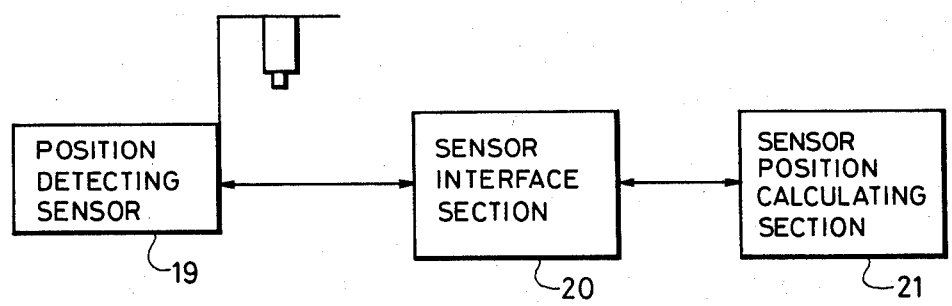
FIG. 3 is a block diagram showing a sensor position compensating section in FIG. 2.

The sensor position compensating section 17, as shown in FIG. 3, includes a position detecting sensor 19, a sensor interface section 20, and a sensor position calculating section 21. The position detecting sensor 19 operates to detect a displacement relative to the position which has been taught. The detection data is applied through the sensor interface section 20 to the sensor position calculating section 21. The sensor position calculating section 21 corrects the taught position according to the detection data thus applied.

Figure 4:
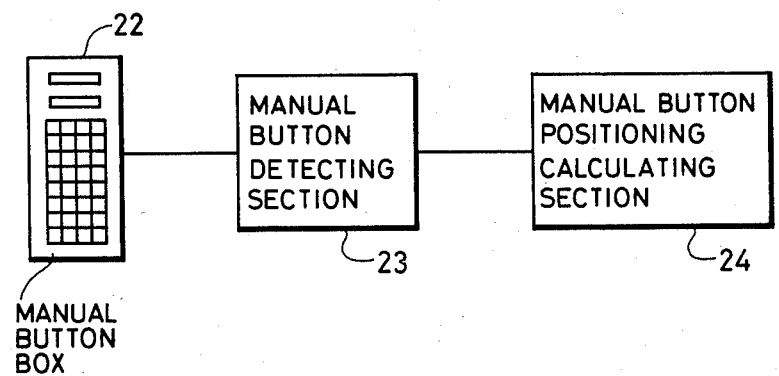
FIG. 4 is a block diagram showing a manual button position compensating section in FIG. 2.

The manual button position compensating section, as shown in FIG. 4, includes a manual button box 22, a manual button detecting section 23, and a manual button position calculating section 24. When, in the manual button box 22, a manual button corresponding to coordinates is depressed, the manual button detecting section detects the depression of the manual button. The data provided by depressing the manual button is applied to the manual button position calculating section 24 from which the desired position is calculated. In FIG. 2, 5a, 5b and 5c designate the first, j-th and n-th object positions which are outputted by the object position generating sections. These object positions are expressed in the orthogonal coordinate system $(X,Y,Z,\alpha,\beta,\gamma)$.

Compressing or enlarging object position variables is effected by a weight function generating section 14 and a weighting section 15. The weight function generating section 14 operates to provide weight functions $W_1, \ldots W_j, \ldots$ and $W_n$ for the object position variables which are produced by the object position generating section 4. The weighting section 15 compresses or enlarges the object position variables using the weight functions.

Figure 1:
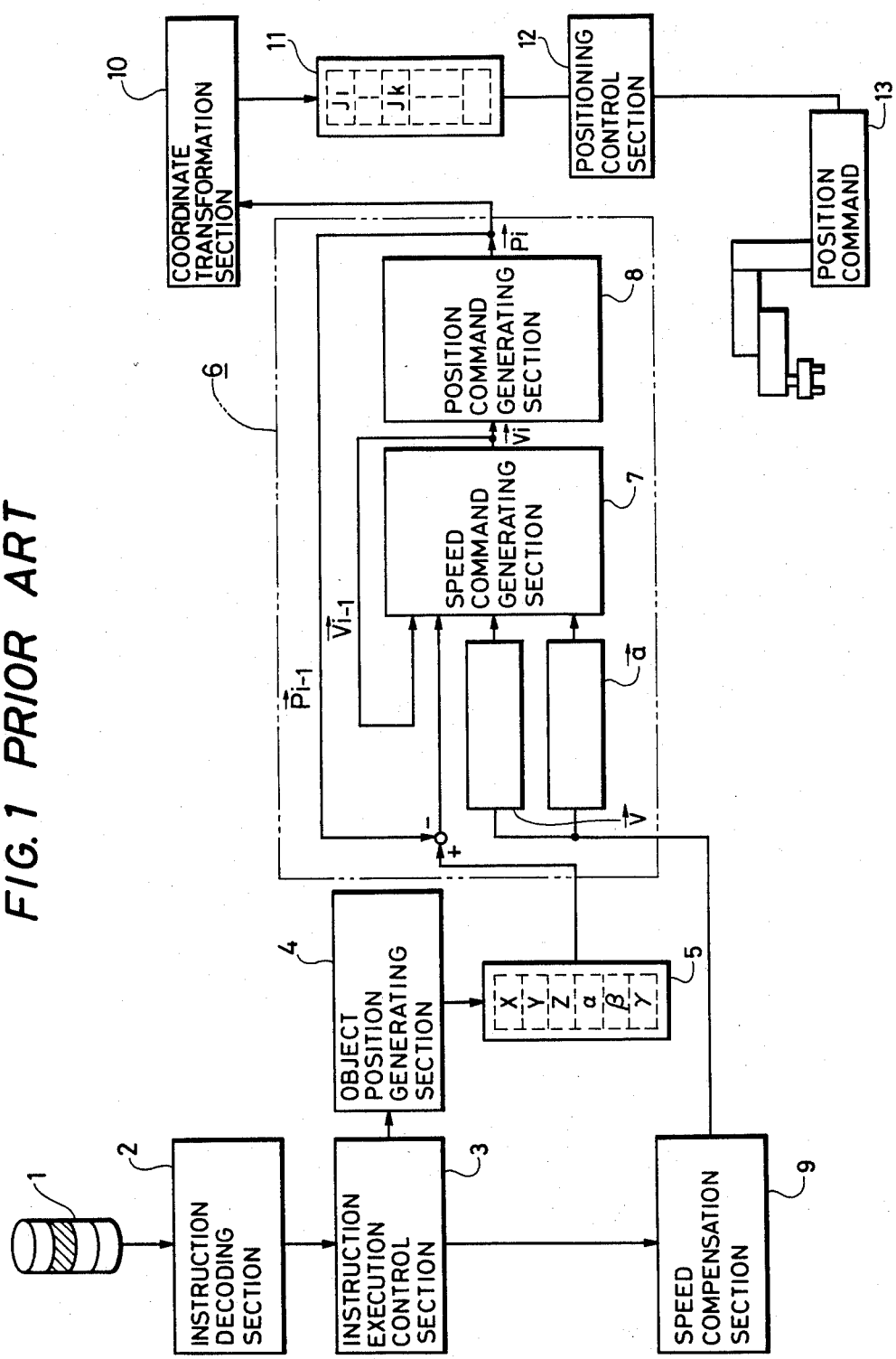
FIG. 1 is a block diagram showing the arrangement of a conventional robot controller.

Position control units 6a, 6b and 6c are provided for the object positions 5a, 5b and 5c, respectively. The position control unit 6a has a speed command generating section 7a and a position command generating section 8a. The position control unit 6b is composed of a speed command generating sectin 7b and a position command generating section 8b. Similarly, the position control unit 6c includes a speed command generating section 7c and a position command generating section 8c. Each of the position control units 6a, 6b and 6c is equal in function to the position control unit 6 shown in FIG. 1. Receiving the object position 5b, the weight function $W_j$ for compressing or enlarging the object position, and the allowable velocity $\vec{v_j}$ and acceleration $\vec{a_j}$ provided by the speed compensating section 9, the speed command generating section 7b performs velocity control for the movement to the j-th weighted object position. The position command generating section 8b performs position control at predetermined time instants in the movement to the j-th weighted object position.

The object position command unit includes a position command addition section 16. In the object position command unit, a plurality of object position commands, i.e., the outputs of the position control units 6a, 6b and 6c provided at predetermined time instants for the weighted object position variables, are subjected to addition at each time instant to provide an object position command at that time instant.

The operation of the robot controller according to the invention will be described.

When one of the programs stored in the program memory device 1 is selected, the instruction decoding section 2 starts decoding the instruction in the program thus selected. The results of decoding each instruction are applied to the instruction execution control section 3. When an instruction in the program which has been decoded by the instruction decoding section 2 concerns the movement of the robot, the instruction execution control section 3 instructs the object position generating section 4 to produce movement object positions which are instructed by the movement instruction. The number of movement object positions varies depending on the kind of movement instruction.

If the number of object positions 5a through 5c produced by the object position generating section 4 is represented by n, and an object position variable for the j-the position control unit 6b by $\vec{P}_{dj}$ (where j=1,...,n), then the variable $P_{dj}$ can be provided in any one of the following ways:

(1) $\vec{P}_{dj}$ is given by teaching, and it is the current position which is available at the time of the teaching and is stored in the program memory unit 1;

(2) $\vec{P}_{dj}$ is given by substitution of a value, and the value is stored in the program memory unit 1;

(3) $\vec{P}_{dj}$ is given by subjecting a position obtained by teaching to position compensation in the sensor position compensating section 17; or (4) when a manual button is depressed in the manual button box 22 for given coordinates, $P_{dj}$ is given by a movement command corresponding to the button.

If $\vec{P}_{d0} = (X_0, Y_0, Z_0, \alpha_0, \beta_0, \gamma_0)$ is a position variable provided by the program memory unit 1 or the sensor position compensating section 17, and $\vec{P}_{j0} = (\Delta X, \Delta Y, \Delta Z, \Delta\alpha, \Delta\beta, \Delta\gamma)$ is a position variable which the manual button position compensating section 18 generates upon depression of the manual button, then the object position variable $P_{dj}$ is as follows:

$$\vec{P}_{dj} = \vec{P}_{d0} + \vec{P}_{j0} = (X_0 + \Delta X, Y_0 + \Delta Y, Z_0 + \Delta Z, \alpha_0 + \Delta\alpha, \beta_0 + \Delta\beta, \gamma_0 + \Delta\gamma).$$

The n object position variables thus formed are weighted by the weight function $W_j$ which is produced by the weight function generating section 14 at the predetermined time instants. The weight functions are represented by $W_1, \ldots, W_j, \ldots$ and $W_n$. The j-th weight function is used for the object position $P_{dj}$ (5b) which is applied to the j-th position control unit 6b, thus compressing or enlarging $P_{dj}$. The j-th weight function is defined as follows:

$$\sum_{j=1}^{n} W_j = 1, \text{ and } W_j \geq 0.$$

In other words, the weight function $W_j$ expresses the dependence of an object position $\vec{P}_{dj}$ with respect to the movement to the object position from the current position.

The weighted object position variable $W_j \vec{P}_{dj}$ is applied to the j-th position control unit 6b. The position control unit 6b performs position control and velocity control using the allowable velocity $\vec{v}_j$ and acceleration $a_j$ provided by the velocity compensating section 9 for movement to $W_j \vec{P}_{dj}$. These controls are independently carried out by the position control unit.

When $\vec{a}$ velocity $\vec{v}$ and an acceleration a are instructed to the system, the velocity compensating section 9, depending on the weight function provided by the weight function generating section 14, specifies allowable velocities and acceleration for the position control unit as follows:

$$\vec{v}_j = W_j \vec{v}, \vec{a}_j = W_j \vec{a}$$

(where j=1, 2, ... and n).

In this case, $$\sum_{j=1}^{n} \vec{v}_j = \vec{v}, \sum_{j=1}^{n} \vec{a}_j = \vec{a}.$$

Therefore, each position control unit performs position control and speed control with the speed and acceleration designated for the system.

The j-th position control unit 6b includes the velocity command generating section 7b and the position command generating section 8b as described above. The velocity command generating section 7b determines the current velocity command $\vec{v}_{j,i}$ according to the weighted object position variable $W_j \vec{P}_{dj}$, the velocity $\vec{v}_j$, the acceleration $\vec{a}_j$, the preceding velocity command $\vec{v}_{j,i-1}$ and the preceding position command $\vec{P}_{j,i-1}$.

The direction of the current velocity command vector $\vec{v}_{j,i}$ is parallel to the direction of $W_j \vec{P}_{dj} - \vec{P}_{j,i-1}$, and the magnitude thereof is determined by determining, depending on the distance $|W_j \vec{P}_{dj} - \vec{P}_{j,i-1}|$, whether the velocity can be increased, maintained equal to the preceding speed, or decreased. In this manner, the velocity command generating section in each position control unit performs acceleration and deceleration and locus control.

The position command generating section 8b in the j-th position control unit 6b produces the current position command $\vec{p}_{j,i}$ according to the current velocity command $\vec{v}_{j,i}$ provided by the velocity command generating section 7b and the preceding position command $\vec{P}_{j,i-1}$. The position commands $P_{j,i}$ provided by the position control unit are subjected to vector addition in the position command adding section 16, as a result of which the following object position command is produced:

$$P_i = \sum_{j=1}^{n} P_{j,i}.$$

When the object position command $P_i$ is applied to the coordinate transformation section 10, $P_i$ expressed in the orthogonal coordinate system $(X,Y,Z,\alpha,\beta,\gamma)$ is subjected to coordinate transformation in the coordinate system $(J_1, \ldots, J_k, \ldots)$ of the axes of the robot. The positioning control section 12 determines amounts of movement for the axes according to the preceding position command expressed in the coordinate system $(J_1, \ldots, J_k, \ldots)$ and the present position command, and applies movement pulse values to its D/A converter, as a result of which the robot is moved to the current object position.

The above-described operations are repeatedly carried out until the robot is moved to the final object position through a plurality of object positions.

In the above-described embodiment, a plurality of object position variables $P_{d1}$ through $P_{dn}$ are expressed in the orthogonal coordinate system $(X,Y,Z,\alpha,\beta,\gamma)$, and the position control and velocity and locus control are performed to cause the robot to move to the object position. However, the object position variables $P_{d1}$ through $P_{dn}$ may be expressed in the coordinate system $(J_1, \ldots, J_k, \ldots)$ of the control axes of the robot. In this case, with respect to the movement of the robot, velocity adjustment control and position control can be performed without stopping at a plurality of positions or a series of points in an articulation operating mode, that is, can be achieved by describing a smoothly curved locus along these positions.

As is apparent from the above description, in the robot controller according to the invention, a plurality of object positions and position control units equal in number to the object positions are provided, and the outputs of the position control units are subjected to addition to allow the subordinate object positions to affect the main object position. Therefore, control of a locus consisting of a series of points is realized. Furthermore, the terminal of the robot which has been moved to an object position which is obtained from various object position variables and weight functions can be caused to quickly react to changes in the environment around the robot by using data outputted by a visual sensor, touch sensor or the like.

We claim:

1. A robot controller comprising:
   movement command forming means for specifying generation of a plurality of movement object positions of a robot in response to an operating instruction;
   object position variable forming means for correcting a plurality of movement object positions specified by said movement command forming means to provide object position variables;
   object position variable compressing/enlarging means for weighting a plurality of object position variables with weight functions representing dependencies of said object positions in movement to said object positions;
   a plurality of position control means for receiving said plurality of object position variables weighted by said compressing/enlarging means to perform speed control and position control in said movement;
   object position command means including a position command adding section for adding output signals of said plurality of position control means to output an object position command; and
   a drive section for outputting signals to drive said robot according to object position commands outputted by said object position command means.

2. The robot controller as claimed in claim 1, in which said object position variable forming means comprises:
   a position compensating section for outputting an object position correcting command; and
   an object position generating section receiving said object position correcting command from said position compensating section for correcting said object positions provided by said movement command forming means to produce a plurality of object position variables.

3. The robot controller as claimed in claim 2, in which said position compensating section comprises a sensor position compensating section.

4. The robot controller as claimed in claim 3, in which said sensor position compensating section comprises:
   a robot position detecting sensor; and
   a sensor position calculating section receiving detection data from said robot position detecting sensor through a sensor interface section for processing said detection data together with a taught position to output a correction command.

5. The robot controller as claimed in claim 2, in which said position compensating section comprises a manual button position compensating section.

6. The robot controller as claimed in claim 5, in which said manual button position compensating section comprises:
   a manual button box; and
   a manual button position calculating section for outputting an object position correcting command according to data provided on depression of a manual button in said manual button box.

7. The robot controller as claimed in claim 2, in which said position compensating section comprises:
   a sensor position compensating section; and
   a manual button position compensating section.

8. The robot controller as claimed in claim 1, in which said compressing/enlarging means comprises:
   a weight function generating section for generating said weight functions; and
   a weighting section for weighting said movement object positions with said weight functions.

9. The robot controller as claimed in claim 8, in which said weight function generating section comprises means for applying weight functions to said weighting section for object position variables provided by said object position variable forming means.

10. The robot controller as claimed in claim 9, in which a weight function $W_j$ provided by said weight function generating section satisfies the following relations:

$$\sum_{j=1}^{n} W_j = 1 \text{ and } W_j \geq 0.$$

11. The robot controller as claimed in claim 9, in which said weighting section comprises means for weighting said object position variables with respective ones of said weight functions.

12. The robot controller as claimed in claim 8, in which said movement command forming means comprises:
   a program memory section for storing programs and data;
   an instruction decoding section for decoding instructions in said programs stored in said program memory section;
   an instruction execution control section for executing instructions decoded by said instruction decoding section; and
   a velocity compensating section for outputting to each of said position control means a velocity and an acceleration for movement allowed in said robot controller.

13. The robot controller as claimed in claim 12, in which said velocity compensating section is adapted to output said allowable velocity and acceleration according to an execution instruction from said instruction execution control section and a weight function provided by said weight function generating section.

14. The robot controller as claimed in claim 1, in which each of said position control means comprises:
   a velocity command generating section receiving a respective one of said weighted object position variables and for determining a respective current velocity; and
   a position command generating section receiving said respective current velocity and for determining a respective current position command, said respective current position command being input to said position command adding section.

15. The robot controller as claimed in claim 1, in which said drive section comprises:
   a coordinate transformation section for converting an object position command provided by said object position command means into a position command expressed in the coordinate system of the axes of said robot; and
   a positioning control section receiving said position command for performing positioning control in movement of said robot.

* * * * *